US008369058B2

(12) United States Patent
Thrue et al.

(10) Patent No.: US 8,369,058 B2
(45) Date of Patent: Feb. 5, 2013

(54) COMPACT SECONDARY SUBSTATION COMPRISING A FAULT PROTECTION SYSTEM, A METHOD FOR FAULT PROTECTION IN A COMPACT SECONDARY SUBSTATION, AND A CONTROL UNIT FOR PERFORMING THE METHOD

(75) Inventors: Carsten Thrue, Braedstrup (DK); Henrik Breder, Vasteras (SE); Leif Lundin, Arboga (SE)

(73) Assignee: ABB Technology Ltd. (CH)

( * ) Notice: Subject to any disclaimer, the term of this patent is extended or adjusted under 35 U.S.C. 154(b) by 0 days.

(21) Appl. No.: 12/560,926

(22) Filed: Sep. 16, 2009

(65) Prior Publication Data
US 2010/0142103 A1 Jun. 10, 2010

Related U.S. Application Data

(63) Continuation of application No. PCT/EP2008/053026, filed on Mar. 13, 2008.

(30) Foreign Application Priority Data

Mar. 16, 2007 (EP) .................................... 07104344

(51) Int. Cl.
*H02H 3/22* (2006.01)
(52) U.S. Cl. ............................... 361/111; 361/2; 361/67
(58) Field of Classification Search .............. 361/62–70, 361/2–14, 111, 118
See application file for complete search history.

(56) References Cited

U.S. PATENT DOCUMENTS

| 5,933,308 A | 8/1999 | Garzon |
| 5,940,547 A | 8/1999 | Schumacher et al. |
| 6,724,604 B2 * | 4/2004 | Shea ............................ 361/118 |

FOREIGN PATENT DOCUMENTS

| DE | 2623816 A1 | 12/1977 |
| EP | 0283189 A2 | 3/1988 |
| EP | 1056179 A2 | 11/2000 |
| EP | 1077518 A2 | 2/2001 |

(Continued)

OTHER PUBLICATIONS

Georgilakis P S et al: "A novel ultra compact distribution substation" 2002 IEEE Power Engineering Society. Summer Meeting. Conference Proceedings. Chicago, IL, Jul. 21-25, 2002, IEEE Power Engineering Society, New York, NY : IEEE, US, vol. vol. 2 of 3, Jul. 21, 2002, pp. 212-219, XP010610522 ISBN: 0-7803-7518-1 (abstract only).

(Continued)

*Primary Examiner* — Rexford Barnie
*Assistant Examiner* — Christopher Clark
(74) *Attorney, Agent, or Firm* — St. Onge Steward Johnston & Reens LLC

(57) ABSTRACT

A Compact Secondary Substation including a fault protection system and a method for fault protection in Compact Secondary Substations (CSS). The CSS includes a Ring Main Unit (RMU), a transformer and a Low Voltage (LV) switchgear. The CSS includes a number of detectors, which detectors can be placed at least in one of the RMU, the transformer or in the LV switchgear, which detectors can be connected to a control unit, which control unit by fault detection by the detectors can activate a fast operating switch for grounding. By using the fast operating grounding switch and controlling this on the basis of the detectors placed inside the CSS, an active arc fault protection is achieved. The control unit also controls the fast operating grounding switch so that it works as a working grounding switch.

16 Claims, 2 Drawing Sheets

FOREIGN PATENT DOCUMENTS

WO 9745850 A1 12/1997
WO 0067271 A1 11/2000

OTHER PUBLICATIONS

Luoma K: "Reduction risk: criteria for choosing an appropriate design approach [for switchgear]" 19970414, Apr. 14, 1997, pp. 3/1-3/5, XP006509410.

Balnaves D: "Risk reduction: Internal arc faults in T&D switchgear. Work of the Regional Electricity Companies to provide a safer substation environment for both operators and Public. Introduction + Part 1: Performance The Good, the bad and the Ugly" IEE Colloquium on Risk Reduction: Internal Faults in T&D Switchgear, Apr. 14, 1997, pp. 7/1-7/3, XP007905730.

Bode K: "Switchgear for 2000 and beyond" Power Engineering Journal, Institution of Electrical Engineers, Hitchin, GB, vol. 14, No. 6, Dec. 1, 2000, pp. 286-292, XP007905720 ISSN: 0950-3366 pp. 289-291.

Torben, S. Gulbrandsen, T.: "The intelligent ring main unit" Trends in Istribution Switchgear: 400V-145KV for Utilities and Private Networks, 1998. Fifth International Conference on (Conf. Publ. No. 459), Nov. 10, 1998-Nov. 12, 1998 pp. 167-172, XP002461258.

* cited by examiner

COMPACT SECONDARY SUBSTATION COMPRISING A FAULT PROTECTION SYSTEM, A METHOD FOR FAULT PROTECTION IN A COMPACT SECONDARY SUBSTATION, AND A CONTROL UNIT FOR PERFORMING THE METHOD

CROSS-REFERENCE TO RELATED APPLICATIONS

The present application is a continuation of pending International patent application PCT/EP2008/053026 filed on Mar. 13, 2008 which designates the United States and claims priority from European patent application 07104344.2 filed on Mar. 16, 2007, the content of which is incorporated herein by reference.

FIELD OF THE INVENTION

The present invention relates to a Compact Secondary Substation (CSS) comprising a fault protection system and a method for fault protection in Compact Secondary Substations (CSS), which CSS comprises a Ring Main Unit (RMU), a transformer and a Low Voltage switchgear (LV switchgear). The invention also relates to a control unit for performing the method.

BACKGROUND OF THE INVENTION

In the state of the art relating to secondary switchgear, active protection reacting automatically to an electric fault is not commonly used. This aspect needs special attendance in case of CSS (Compact Secondary Substation) which are placed in public accessible areas. With respect to an arc fault which is accompanied by a sudden and extreme pressure increase, the CSS has to relieve the pressure in order to protect the public and also operators from harm. One of such measures is for example the use of pressure relief openings in the top of the CSS, above human head level. It is well known that in CSS is an arc killer installed inside the tank for the SF6 gas of the ring main unit. This arc killer senses the sudden increase of pressure caused by an internal electric arc inside the tank and reacts by grounding the internal bus bars. The reaction on the pressure increase takes more than 20 ms from arc inhibits so that an explosion is prevented but damage to the ring main unit usually occurs, and extended repair is necessary. Manual reset operation is needed on site to reset the ring main unit. Apart from that, the arc killer is a one-shot mechanism, i.e. when it is tripped it needs service or even replacement. The usual time between the tripping of the arc killer and the re-establishing of the power connection takes at least several hours.

WO 00/67271 concerns an electric switching device for fast closing of a high current in a power network comprising a first electrode, a second electrode, a movable contact element closing said first and second electrodes, and an operating device. The operating device comprises a helically wound first coil secured to the first electrode. The movable contact element comprises a flange making contact with the coil. A current pulse flowing through the coil forms a repulsive force between the coil and the flange, said repulsive force throwing the movable contact element to the second electrode and completing the closing operation.

CSS containing LV and HV side are normally not true arc safe, due to mismatch of applicable standards. Enclosures around an arc fault may open up and cause impact on working staff. At least an exhaust channel is provided to avoid suffocating from hot gases, however in tight spaces as underground, exhaust channels and pressure relief is hard to arrange.

The object of the invention is to fault protect a secondary switchgear, to make the CSS truly arc proof i.e. to protect the equipment from hazards and to limit the damage. A further object of the invention is to bring the secondary switchgear back in operation after fault situations as soon as possible.

SUMMARY OF THE INVENTION

These objects can be fulfilled by a Compact Secondary Substation (CSS) comprising a fault protection system, which CSS comprises a Ring Main Unit (RMU) with high voltage power lines, a transformer and a low voltage (LV) switchgear, characterized having the characterizing features that the CSS comprises a number of detectors, that detect the occurrence of an arc fault, which detectors are placed at least in one of the RMU, the transformer or in the LV switchgear, that the CSS comprises a control unit and the detectors are connected to the control unit, and that the CSS comprises at least one fast operating switch for grounding, which control unit upon arc fault detection by the detectors activates the fast operating switch for grounding, thereby grounding at least one of the high voltage power lines, and which control unit can also control the fast operating switch as a working grounding switch.

In the present invention the expression "working grounding" is a grounding which is established deliberately to provide safety by work or by maintenance at the CSS.

By using a fast operating switching device for grounding, also called arc eliminator, for example as described in the WO 00/67271 and combining it with detectors that detects the occurrence of an arc fault, such as a so called arc guard that detects arc light, and adding an extended functionality of controllability for activating and deactivating the grounding function at will in order to obtain a working grounding, active arc fault protection in combination with a working grounding switch is achieved.

As mentioned, a fast operating switching device for grounding, called arc eliminator, as such is known (see ABB brochure "Arc Eliminator" and WO 00/67271). It is used today in primary switchgear and reacts on the arc light instead of the pressure. The reaction time is below 10 ms, thereby—if used in a CSS—preventing damage to the ring main unit (RMU). However, according to the invention, detectors can be placed in the RMU and also on all relevant places on the transformer and LV side and connected to the fast operating switching device for grounding (arc eliminator). Since an active protection of the whole CSS is thereby provided, no passive protection tests are needed (cost saving). The known arc eliminator is resetable thereby eliminating the need for replacement.

This feature allows the use of a Control Unit to control the status of the fast operating grounding switch/arc eliminator and the detectors. According to the invention, the fast operating grounding switch is controllable by the Control Unit, so that grounding may also be performed intentionally. This allows the use of the fast operating grounding switch not only as a fast switching device for protection purposes but also as a working grounding switch. The conventional working grounding switch can be omitted (cost and space saving). In order to comply with the safety standards, the fast operating grounding switch is additionally equipped with a mechanical indication of the current status.

It must here be emphasized that the present invention is not in any way limited to using the particular fast operating switching device (arc eliminator) that is the subject of WO 00/67271. Any fast operating grounding switch having the particular features necessary for the invention may be used. The reference to WO 00/67271 is only made to indicate an example of at switch that may be used in the invention.

By using a fast operating grounding switch and controlling this fast operating grounding switch on the basis of the detectors placed inside the CSS, an active arc fault protection is achieved. In order to avoid damage to the CSS and in fact to avoid direct explosions of the CSS which can be very critical if the CSS is placed in a populated area, it is necessary to reach a grounding of the high voltage inlet as fast as possible after a failure situation, e.g. if an arc fault is detected. The activation of the grounding should take place as fast as 5 milliseconds after the arc is detected at first. In this way, the energy that is released inside the CSS can be reduced to a level where a direct explosion is avoided. Especially in CSS-systems placed as subterranean constructions without any ventilation openings to the atmosphere, it is very important to avoid explosions from arc failures. Even in underground level placed CSS-systems, an explosion will typically damage the entire CSS such that the entire equipment has to be replaced. This is unpleasant for the area which is supplied with electricity from the CSS as the power consumers have to live for at least one or perhaps more days without any electricity. In a subterranean CSS, an explosion could even be more dangerous than an explosion taking place in an underground mounted CSS.

By arc fault detection the control unit can transmit a signal to a trigger unit, which trigger unit activates a fast operating switch into a grounding position. The use of the trigger unit might accelerate the activation of the fast operating grounding switch.

Activation of the fast operating switch leads to activation of at least one of a number of circuit breakers arranged at the high voltage inlet in the CSS, in order to clear the arc fault selectively. This voltage would in practice often be in the range 1 kV to 50 kV. The circuit breakers operate relatively slow compared to the fast operating grounding switch, but typically a circuit breakers will have been activated after approximately less than 70 milliseconds.

The detectors can detect abnormal activities in the CSS, where the detectors can detect light and/or smoke, where the control unit based on the detected signal decide if the fast operating grounding switch or only the regular circuit breakers have to be activated. A number of different detectors can operate in the CSS. In a CSS there is typically not any need for light; therefore a light detector will easily and effectively indicate any kind of a malfunction. Also smoke detectors can indicate a fire a long time before the optical systems will be able to detect that smoke is generated. Also pressure detectors could be useful such that e.g. pressure in closed circuits for e.g. insulating liquids in the transformer might be under control. These different signals can be handled differently in the control unit. The control unit could take different action in different situations. Only where extreme danger occurs the control unit will activate the fast operating grounding switch. In other situations, the control unit might send out an alarm to a control room where the control room can take over the control of the CSS and based on the detector signals be able to take a decision about a shut down or that maintenance is needed in a few hours.

The CSS may also comprise an additional fast operating switch for grounding low voltage lines of the LV switchgear, and the control unit is arranged to activate the additional fast operating switch for grounding based on detection of an arc fault by any one of the detectors.

The detectors can be arc detectors, where the control unit based on the arc detection activates the fast operating grounding switch. It is preferred that a number of arc detectors are placed at first in the ring main unit, in or near the transformer or in the low voltage switchgear in the CSS. A detection of arc fault will immediately lead into a situation where the fast operating switch is activated for grounding at least the high voltage side of the transformer in the ring main unit. Grounding might also be performed in the low voltage switchgear.

The control unit comprises processor means, which processor means monitor the detectors. In a control unit a micro processor might be used to monitor the detectors. The micro processor can operate in a way where detected signals are immediately evaluated and decision is taken in a few milliseconds and by the trigger unit the fast operating grounding switch is activated, a few milliseconds after e.g. that an arc fault is detected somewhere in the CSS.

The control unit can also comprise a logic circuit for handling signal from the arc detectors, which logic circuit activates the trigger circuit. An even faster handling of the signals from arc detectors can be performed by using NAND gates operating in an asynchronous state. A logic circuit based on NAND gates might take logic decisions as fast as a few micro seconds. In this way, the signal for activating the trigger unit and the fast operating grounding switch can leave the control unit much faster than a single millisecond. In this way, a very fast grounding can be achieved.

In a fault situation the control unit can be supplied from an uninterruptible power supply (UPS). If the control unit also has a function for de-activating the grounding situation and if the control unit monitor detectors also in a fault situation it is very important that the control unit continues its operation after grounding.

The control unit can be connected to a remote control so that the grounding action can be initiated remotely from outside the CSS, i.e. from a service center or from a terminal carried by the maintenance personnel/operator. By connecting the control unit to a remote control, it is possible for a computer based electricity control system for controlling the CSS. Also in a fault situation, maintenance workers could be able to control the CSS by means of a remote control. Also before entering the CSS in no-fault situations, the personnel will be able to shut down the CSS in a soft way, e.g. by a hand held remote control, and to ground the CSS such that it is safe to work inside the housing.

The objects can also be fulfilled by a method for fault protection in a Compact Secondary Substation (CSS), which CSS comprises a Ring Main Unit (RMU) with high voltage power lines, a transformer and a low voltage (LV) switchgear and having the characterizing features of supervising a number of arc fault detectors arranged in the CSS, by means of a control unit, which detectors are supervising at least one of the RMU, the transformer or the LV switchgear for arc fault detection, activating, by the control unit, at least one fast operating switch for grounding at least one of the high voltage power lines, upon arc fault detection, activating, by the control unit, at least one of a number of circuit breakers arranged at the high voltage inlet in the CSS, in order to clear the arc fault selectively, and controlling the fast operating switch as a working grounding switch, by the control unit.

Finally, the present invention is also directed to a control unit for performing this method.

By the present invention, critical arc failures can be avoided in that a shut down of the CSS takes place before an arc failure has damaged the CSS.

DETAILED DESCRIPTION OF THE INVENTION

Figure 1:
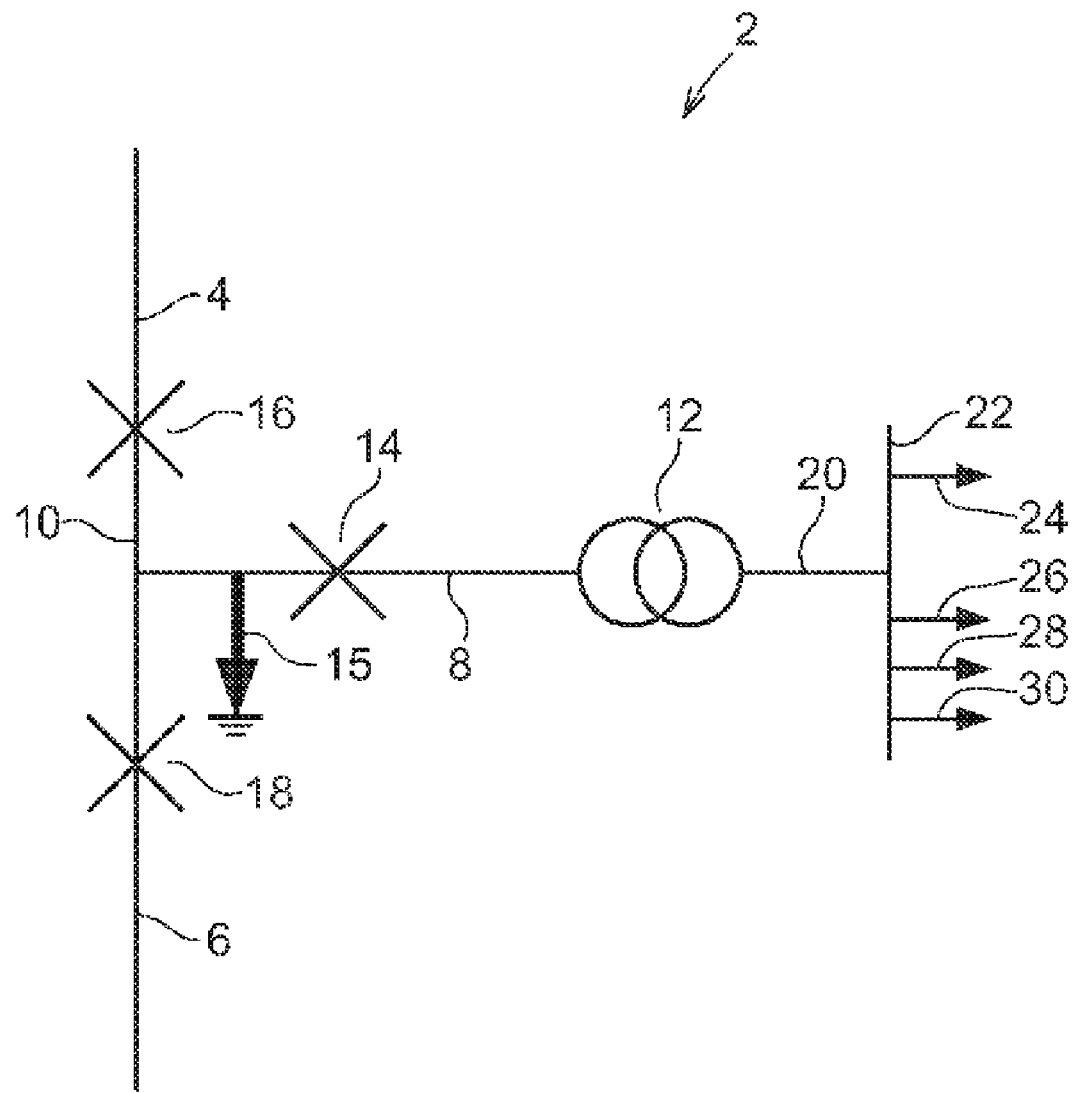
FIG. 1 shows a typical CSS in operation.

FIG. 1 shows a CSS system 2 which is connected to a high voltage line 4 which by the line 6 forms a part of a ring connection (Ring Main Unit, RMU) of a high voltage power supply line. The line 8 is the high voltage connection towards the transformer 12. A line 10 connects the high voltage lines 4 and 6 with the line 8 in normal operation. A switching device in the form of a circuit breaker 14 is placed in the line 8 and a switching device in the form of a circuit breaker 16 is placed in the line 4. Further, a switching device in the form of a circuit breaker 18 is shown in the line 6. The transformer 12 has a low voltage outlet 20 connected to a low voltage switchgear 22 from where consumer connections 24, 26, 28 and 30 are indicated. Connected to the low voltage 20 outlet there is also a low voltage circuit breaker that may be placed in the low voltage switchgear 22.

In operation, the high voltage lines 4 and 6 carry a voltage which could be between 1 or 50 kV where the transformer 12 reduces the voltage to 230-250 volts. In a maintenance situation the circuit breaker 14 might be open and the line 8 as such is not connected to the high voltage supply. In an emergency situation, a fast operating grounding of the line 8 might be necessary. This is indicated by the arrow 15. This grounding will immediately reduce the high voltage at the line 4, 6 and 10, but relatively soon after the grounding, the circuit breakers 16 and 18 might open such that the line 10 and 8 are the only lines which are ground connected while the lines 4 and 6 can continue operation at high voltage because they are part of the same ring.

Figure 2:
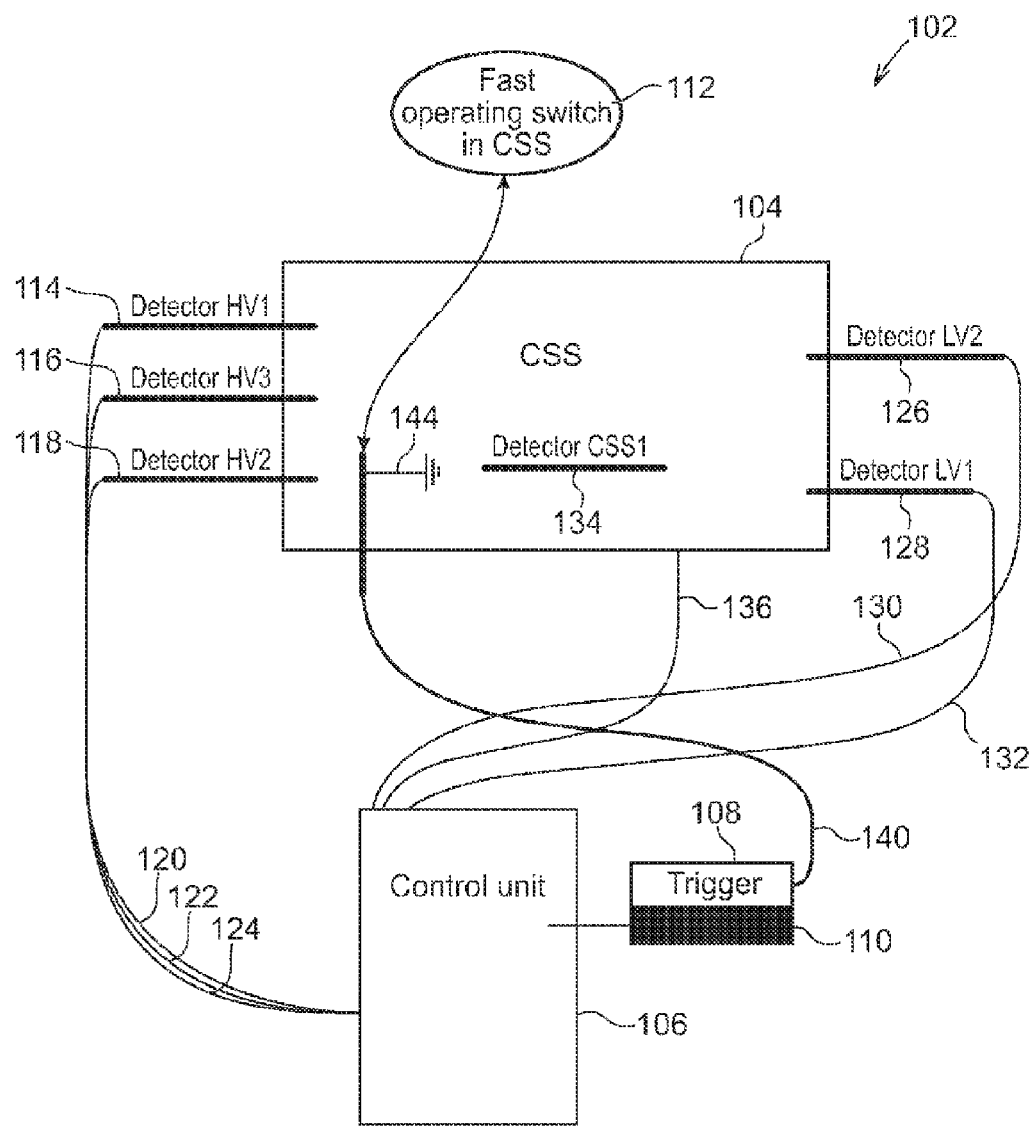
FIG. 2 shows an embodiment of a fault protection system in a CSS according to the invention.

FIG. 2 shows an embodiment for a CSS system 102 according to the invention. The inner 104 of the CSS comprises all of the components that are described above as included in the CSS of FIG. 1. Furthermore, it comprises a control unit 106 which is connected to a trigger unit 108 and which control unit cooperates with an uninterruptible power supply circuit (UPS) 110. There is also a fast operating grounding switch 112 in the CSS, which may comprise the above described arc eliminator or a corresponding device. High voltage arc fault detectors 114, 116, 118 are connected by lines 120-124 to the control unit 106. Low voltage arc fault detectors 126 and 128 are connected by lines 130 and 132 to the control unit. Furthermore, an arc fault detector 134 is also indicated in the CSS, which detector over line 136 communicates with the control unit. There is also a trigger unit 108 that is connected to the fast operating grounding switch 112, via line 140. The fast operating grounding switch 112 is connected to ground via line 144, which corresponds to the arrow 15 in FIG. 1. The high voltage arc fault detectors are arranged on the high voltage side of the CSS, and the low voltage arc fault detectors are arranged on the low voltage side, The arc fault detectors 114, 116, 118, 126, 126, and 124 may be detectors that detect light or smoke and thereby detect the occurrence of an arc fault. It would also be possible to have other types of detectors, for example voltage or current detectors or sensors, or pressure sensors, which indirectly can indicate that there is an arc fault in the CSS.

In normal operation, the transformer in the CSS will have a high voltage input and a low voltage output. The different detectors 114, 116 and 118 at the high voltage side and the detectors 126 and 128 at the low voltage side are monitoring all arc critical positions around the CSS. The number of detectors can be much higher than the one here indicated. If one of the detectors 114, 116, 118 or 126 and 128 indicates a fault e.g. detecting a beginning arc, a signal is immediately transmitted over lines 120, 122, 124 or 130, 132 to the control unit 106. This control unit will activate the trigger 108 which over line 140 transmits a signal to the fast operating grounding switch 112 which immediately is grounding at least the high voltage side of the transformer, in most cases by grounding the ring main unit. This grounding takes place as fast as approximately 3-7 milliseconds after the first arc is indicated. However, it is also necessary to clear the fault by activating at least one of the circuit breakers 14, 16, 18. This can be done in the same way as is usually done in today's systems that do not include the fast grounding switch, or it can be done by signals received from the control unit. This activation should be done selectively, depending on the location of the arc fault. A fault in the transformer cell or LV switchgear shall be cleared by the outgoing circuit breaker 14 and a fault in the HV switchgear shall be cleared by the incoming circuit breakers 15 and 16. These circuit breakers are also automatically backed up by up-streams circuit breakers, serving as back-up breakers in the distribution system feeding the CSS. This means that in cases where the switching devices that are closest to the fast operating grounding switch 112 are only load breakers, a back-up circuit breaker upstream must be activated in order to clear the fault. Typically, a circuit breaker should have been activated in no more than 200 milliseconds.

Fault occurrence is communicated between LV and HV switchgear and the transformer space, providing information for decision on closing the fast operating grounding switch. Any arc in the substation enclosure is automatically detected. The fast grounding switch takes all the energy from the supply that otherwise would sustain the arc. The same function also provides safety on the LV side and consequently from the safety aspect, the LV circuit breaker can possibly be omitted, saving cost and complexity. Fast grounding on the HV side will have a positive effect also on the LV side, but it is also conceivable to have a separate fast operating grounding switch on the LV side, for grounding the low voltage lines.

After activation of the fast operating grounding switch 112 and circuit breaker(s), the control unit 106 which is connected to the UPS-supply 110, continues operation. The control unit 106 might send out an alarm signal in order to start a procedure where at first a manual control of the control unit is performed from a control room in order to check if there is a critical failure or maybe the control unit could be ordered into normal operation again by means of a remote control.

The very fast operating grounding switch will reduce damage in the CSS 102 and the fast reaction will probably avoid direct explosion in the CSS 102, but probably, after arc detection there will be some damage somewhere in the CSS 102 such that maintenance is necessary before a new activation. In order to be able to do go inside the CSS to check the damages or to do maintenance work on the CSS, a working grounding has to be established. This working grounding can be established by having the control unit 106 sending a signal to the fast operating grounding switch 112 to also perform a working grounding. One possible way of doing this would be by using the remote control.

Whenever required, the control unit 106, may be used for achieving a working grounding by activating and de-activating the fast operating grounding switch 112 at will.

Furthermore, in some cases, it may be necessary to have a combination of detectors. For example when using light detectors to indicate the occurrence of an arc it may in some cases be required to also have detectors for electrical signals (e.g. current or voltage detectors). There may exist cases where the detectors for electrical signals are set in the control unit to overrule the triggering of the fast operating grounding switch 112 based on arc detection, for example for safety reasons. Additional electric detectors can also have a safety function when working grounding has to be activated.

What is claimed is:

1. A Compact Secondary Substation (CSS) comprising a fault protection system, which CSS comprises a Ring Main Unit (RMU) with high voltage power lines, a transformer and a low voltage (LV) switchgear, characterized in that the CSS comprises:
    detectors that detect the occurrence of an arc fault, which detectors are placed at least in one of the RMU, the transformer or the LV switchgear,
    a control unit and the detectors are connected to the control unit, and
    at least one switch for grounding,
    circuit breakers arranged at a high voltage inlet in the CSS,
    wherein said control unit, upon arc fault detection by the detectors, activates the switch for grounding, thereby grounding at least one of the high voltage power lines, and said control unit also controls the switch as a working grounding switch,
    wherein activation of said switch causes said at least one circuit breaker to activate such that the arc fault is cleared selectively.

2. The Compact Secondary Substation according to claim 1, further comprising a trigger unit and by arc fault detection the control unit transmits a signal to the trigger unit, which trigger unit activates the switch into a grounding position.

3. The Compact Secondary Substation according to claim 1, wherein the activation of the at least one circuit breaker is controlled by the control unit.

4. The Compact Secondary Substation according to claim 1, further comprising an additional switch for grounding low voltage lines of the LV switchgear, and the control unit is arranged to activate the additional switch for grounding based on detection of an arc fault by any one of the detectors.

5. The Compact Secondary Substation according to claim 1, wherein the detectors are arc detectors, and based on the arc detection, the control unit activates the switch.

6. The Compact Secondary Substation according to claim 1, wherein the control unit comprises a processor for monitoring the detectors.

7. The Compact Secondary Substation according to claim 1, wherein the control unit comprises a logic circuit for handling a signal from at least one of the detectors, which logic circuit activates a trigger circuit.

8. The Compact Secondary Substation according to claim 1, wherein the control unit is connected to an uninterruptible power supply.

9. The Compact Secondary Substation according to claim 1, wherein the control unit is connected to a remote control.

10. A method for fault protection in a Compact Secondary Substation (CSS) that includes a Ring Main Unit (RMU) with high voltage power lines, a transformer and a low voltage (LV) switchgear, comprising the steps of:
    monitoring a number of arc fault detectors arranged in the CSS with a control unit, which detectors are monitoring at least one of the RMU, the transformer or the LV switchgear for arc fault detection,
    activating at least one switch for grounding at least one of the high voltage power lines, upon arc fault detection,
    activating a circuit breaker arranged at the high voltage inlet in the CSS, in order to clear the arc fault selectively, and
    controlling the switch as a working grounding switch with the control unit.

11. A control unit for performing the method according to claim 10.

12. The Compact Secondary Substation according to claim 2, wherein the control unit comprises a logic circuit for handling the signals from the detectors, which logic circuit activates the trigger unit.

13. A Compact Secondary Substation (CSS) providing fault protection and comprising:
    a Ring Main Unit (RMU) connected to high voltage power lines;
    a transformer;
    a low voltage switchgear;
    a plurality of detectors that detect the occurrence of an arc fault;
    a control unit;
    at least one switch for grounding one of the power lines;
    at least one circuit breaker arranged at a high voltage inlet;
    at least one circuit breaker arranged downstream of said transformer;
    said detectors are connected to the control unit and are positioned in at least one of: said RMU, said transformer or said switchgear;
    wherein, upon detection of an arc fault by the detectors, said control unit activates said switch such that at least one of the power lines is grounded, and said control unit also controls the switch as a working grounding switch; and
    wherein activation of said switch causes one of at least said at least one circuit breaker arranged at said high voltage inlet and said at least one circuit breaker arranged downstream of said transformer to activate such that the arc fault is selectively cleared.

14. The Compact Secondary Substation according to claim 13, further comprising a trigger unit, and wherein upon detection of an arc fault said control unit transmits a signal to said trigger unit, which activates said at least one switch into a grounding position.

15. The Compact Secondary Substation according to claim 13, wherein said control unit activates said at least one circuit breaker.

16. The Compact Secondary Substation according to claim 13, further comprising a second switch connected to a low voltage line that is connected to said low voltage switchgear, wherein said control unit activates said second switch for grounding the low voltage line connected to said low voltage switchgear upon detection of an arc fault.

* * * * *